US007404505B2

(12) United States Patent
Walther

(10) Patent No.: US 7,404,505 B2
(45) Date of Patent: Jul. 29, 2008

(54) DRIVER ACCESSIBLE WHEELCHAIR CARRIER

(75) Inventor: William Paul Walther, Arroyo Grande, CA (US)

(73) Assignee: William P. Walther, Arroyo Grande, CA (US)

( * ) Notice: Subject to any disclaimer, the term of this patent is extended or adjusted under 35 U.S.C. 154(b) by 460 days.

(21) Appl. No.: 10/912,668

(22) Filed: Aug. 6, 2004

(65) Prior Publication Data

US 2006/0027619 A1 Feb. 9, 2006

(51) Int. Cl.

| | |
|---|---|
| ***B60R 7/00*** | (2006.01) |
| ***B60R 9/06*** | (2006.01) |
| ***B60N 2/32*** | (2006.01) |
| ***B60P 9/00*** | (2006.01) |

(52) U.S. Cl. ....................... 224/566; 224/407; 224/282; 280/769; 280/289; 296/69; 414/462; 414/537

(58) Field of Classification Search ................. 224/566, 224/556, 407, 282, 42.43; 296/26.08, 29, 296/30, 65.11, 65.13, 69, 147, 146.6, 541, 296/65; 280/769, 770, 65.13, 289; 414/537, 414/462, 546
See application file for complete search history.

(56) References Cited

U.S. PATENT DOCUMENTS

| | | | | |
|---|---|---|---|---|
| 5,308,214 | A * | 5/1994 | Crain et al. | 414/541 |
| 5,395,020 | A * | 3/1995 | King | 224/521 |
| 5,431,524 | A * | 7/1995 | Antal et al. | 414/537 |
| 5,894,968 | A * | 4/1999 | Christensen | 223/1 |

* cited by examiner

*Primary Examiner*—Nathan J Newhouse
*Assistant Examiner*—Lester L Vanterpool

(57) ABSTRACT

An enclosed carrier for a folded wheelchair, mounted on the outside side of an automobile, behind and adjacent to the driver's door, so that a wheelchair user can shift himself from his wheelchair to the driver's seat, then fold and store his own wheelchair, thus maintaining an economical independence.

4 Claims, 7 Drawing Sheets

DRIVER ACCESSIBLE WHEELCHAIR CARRIER

BACKGROUND OF THE INVENTION

1. Field of the Invention

The present invention relates to vehicle mounted wheelchair carriers and, more particularly to carriers accessible to the driver, from the driver seat.

2. Related Prior Art

An ever increasing number of disabled and wheelchair users are traveling in this era. A more responsible society is making most government facilities, as well as the industrial complex wheelchair accessible. Traveling in the company of able-bodied people is relatively easy. Wheelchairs are folded to be placed in the car's trunk, or placed behind the front seat, or in SUVs, or in pickup truck beds.

Many carriers attach at the rear of a vehicle to preserve interior space. Watt in U.S. Pat. No. 5,199,842 offers an enclosed carrier with a ramp to facilitate loading. Some of these rear mounted carriers such as Himel in U.S. Pat. No. 6,595,398 even elevate a wheelchair or scooter to travel height. However, the very disabled and quadriplegic persons must travel in special vans with ramps or power wheelchair lifts.

A unique situation exists for the wheelchair user who retains the command of his or her arm and hand strength. While they may operate their vehicle independently, with the aid of a hand-controller, dealing with the wheelchair becomes their sole responsibility. This person must be able to fold, to lift, and to store their own wheelchair.

Light weight wheelchair chairs with detachable foot rests and detachable rear wheels help make this easier. Considering the automobile, normally all that is economically available to the wheelchair users is 1) the front passenger seat of a car without a center counsel , or 2) the floor space behind the driver's seat, of a two door car.

Yearly changes in the auto size and style make new car choices difficult for this special need. Economy of operation continues to be critical for the wheelchair user who travels.

Two ingenious inventors, Steffes in U.S. Pat. No. 5,827,036 and Kameda in U.S. Pat. No. 6,273,668 both offer a roof mounted device which is applicable to any automobile. These apparatus lift a folded wheelchair vertically away from the drivers door, store it in a waterproof compartment, and present it back at the drivers door, upon request.

Steckler in U.S. Pat. No. 5,746,563 discloses a system mounting in an automobile trunk, which opens the trunk, reaches around the car and telescopes up to the driver's door to pick up a wheelchair, and store it away in the trunk, then to represent it back at the drivers door when requested. These devices use electronic operators and controllers. They require maintaince and are expensive. This limits their availability to the average paraplegic person.

It is therefore, an object of the present invention to provide a new and economical low technology wheelchair carrier, easily accessible to the driver, which can be mounted to any automobile.

BRIEF SUMMARY OF THE INVENTION

The present invention is directed to an economical folded wheelchair carrier, where in the carrier is mounted on the side of an automobile, accessible to the driver. Thus, this present invention satisfies the need for a wheelchair storage place for the wheelchair user who retains the command of his or her arm and hand strength. Now such a person can fold, and store his own wheelchair outside of the passenger compartment. To these ends an enclosed compartment is provided, attached alongside an automobile adjacent to and behind the driver's door. In the preferred embodiment, after transferring to the driver's seat, the wheel chair user opens the compartment, folds the chair, detaches the right rear wheel by its quick release axel, rolls the chair on one rear wheel into the carrier, then stores the loose wheel inside and closes the compartment. Now he is an independent driver.

In some alternate embodiments the wheel chair carrier may be widened allowing the wheel chair entry with both rear wheels in place. And yet alternately, with both rear wheels removed, able to enter on a slide track allowing the narrowest and lowest profile driver accessible wheelchair carrier.

A further feature of the invention is its ability to be moved easily to a different vehicle, as the car ages and conditions or circumstances for the wheelchair user change. Accordingly, it is another object of the present invention to provide variety for the wheelchair user, allowing him to easily transfer or change his same carrier from an enclosed sedan to for example, an open two seat roadster.

To these ends, the mount also allows the folded wheelchair carrier to pivot up, out of the way of the automobile rear wheel, allowing service access to that wheel and tire.

It is yet a further object of this present invention to provide an affordable driver accessible wheelchair carrier for the many wheelchair users throughout the world today.

These and other objects, features, aspects, and advantages of the present invention will become better understood with reference to the following description and accompanying drawings.

DRAWING NUMBER SUMMARY (NOTE NUMBERS NOT CONTINUOUS)

1-16 Drawing Figure
21 Automobile
21*a* Alternate Automobile
22 Driver's Door
23 Driver'Seat
24 Left Rear Wheel & Tire
25 Driver Rear View Mirror
26 Automobile Bottom
30 Slide in wheel chair carrier
31 Rear Cantilever Beam
32 Carrier—preferred embodiment
32*a* Carrier (wide 2 rear wheels)
32*b* Carrier (narrow, no rear wheels)
32*c* Carrier—alternate embodiment, clam shell style
33 Bottom Door/Ramp
34 Top Door/Cover
34*a* Top—alternate embodiment, clam shell style
34*b* Lanyard
34*c* Gas Strut
34*d* Hinge
35 Carrier Bottom
36 Support Bracket
37 Bottom Plate
38 Forward Pivoting Cantilever Beam
39 Upper/Inside Plate
40 Bolt and Nut
42 Open Wheelchair
43 Folded Wheelchair, One Wheel Removed
43*a* Folded Wheelchair, Both Rear Wheel in place
43*b* Folded Wheelchair, Both Rear Wheels Removed
44 Removed Right Rear Wheel
45 Wheelchair Frame
46 Folded Wheelchair, footrest removed
52 Steering Wheel—Alternate
53 Driver Seat—Alternate
54 Front Passenger Seat
55 Rear Passenger Seat, Shortened
56 Drivers Door—Alternate
57 Front Passenger Door
58 Left Rear Passenger Door
59 Folded Wheelchair Space
62 Open Space cut from Floor
63 Floor Structural Reinforcement
64 Floor filler on Door
65 Fold Down Ramp
66 Ramp folded Up
67 Hook From Roof
50 Section Line
60 Section Line
70 Section Line
80 Section Line
90 Section Line

DETAILED DESCRIPTION OF THE PRESENT INVENTION

Figure 1:
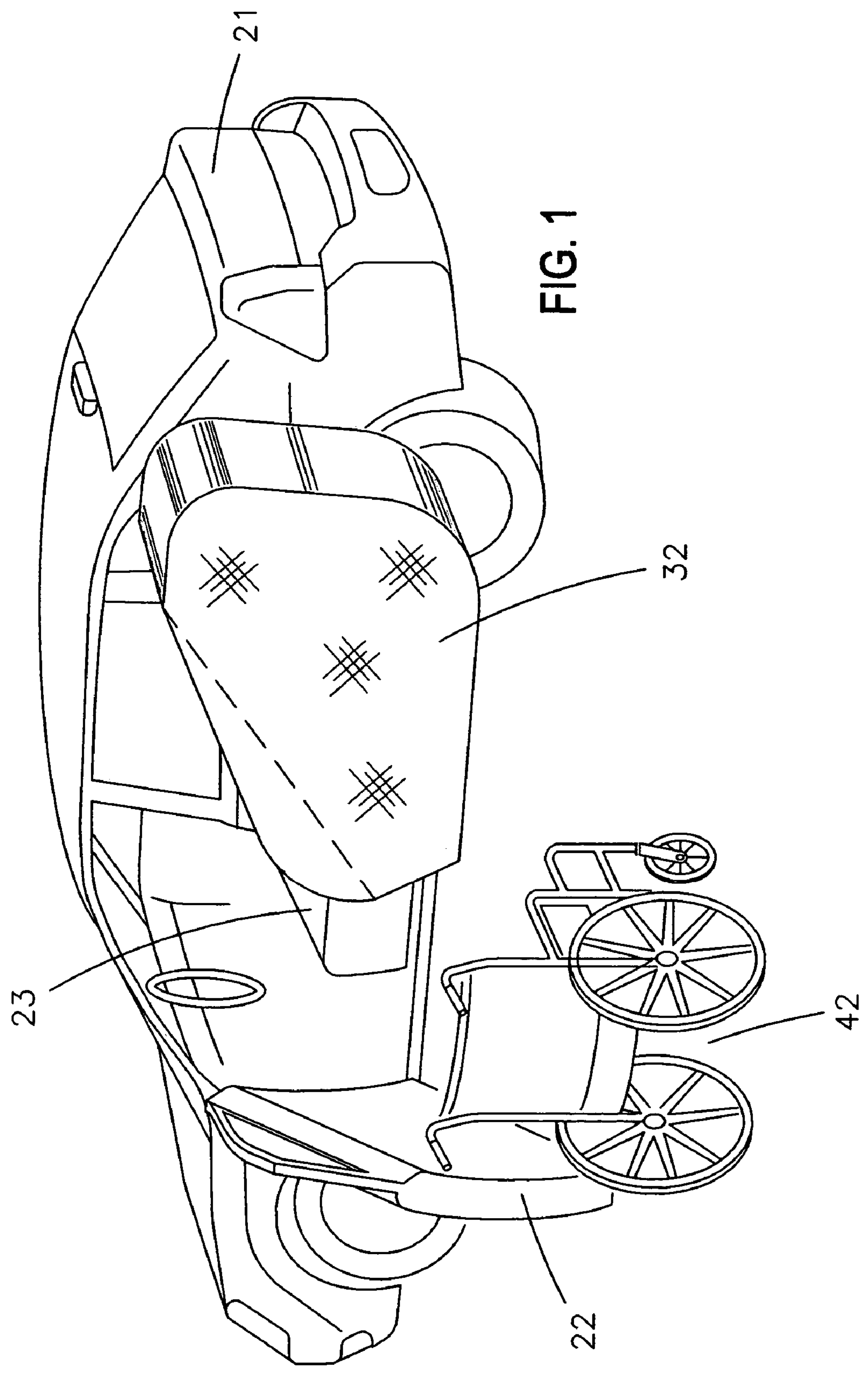
FIG. 1 is a perspective view of an automobile with a driver accessible wheelchair carrier while a wheelchair is positioned for the wheelchair user to transfer to the automobile driver seat.

Referring to the drawings, FIG. 1 shows in a perspective view an automobile 21 with a driver accessible wheelchair carrier 32 of the present invention installed. The driver's door 22 is open, demonstrating the close proximity of the driver's seat 23 to an open wheelchair 42 and to the driver accessible wheelchair carrier 32.

Figure 2:
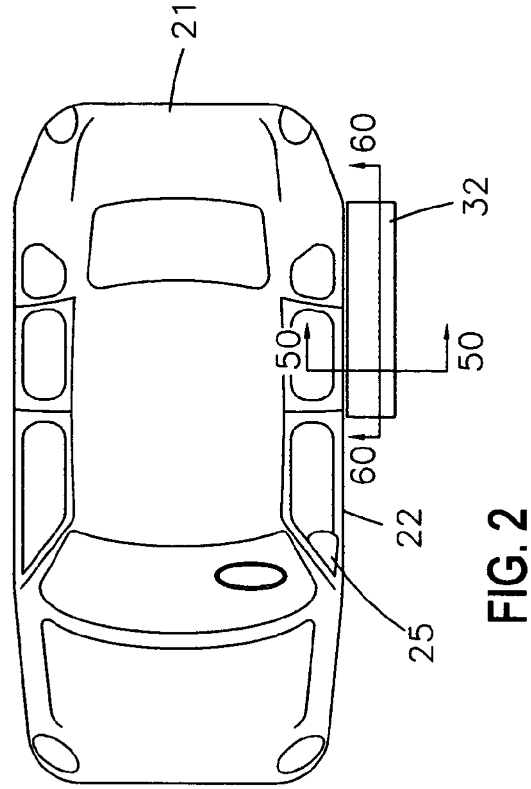
FIG. 2 is a plan view of an automobile with a driver accessible wheelchair carrier of the present invention installed.

FIG. 2 illustrates in a plan view the novel feature of the present invention where the driver accessible wheelchair carrier 32 is mounted immediately behind the driver's door 22.

Figure 4:
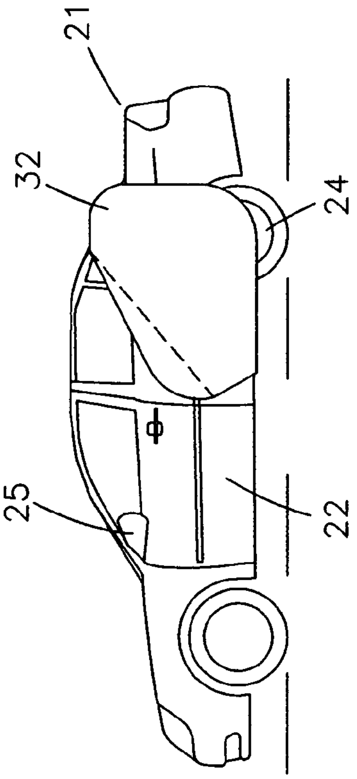
FIG. 4 is a side view of an automobile with a driver accessible wheelchair carrier.
Figure 3:
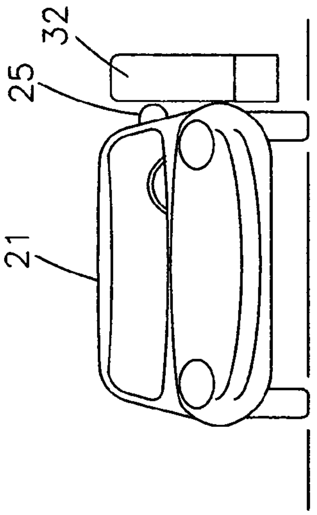
FIG. 3 is a front end view of an automobile with a driver accessible wheelchair carrier.

FIG. 3 is an end view showing the wheelchair carrier 32 mounted to automobile 21 and showing the driver's line of sight from the rear view mirror 25. In more detail, FIG. 4 is an elevational view showing the carrier 32 covering the left rear wheel and tire 24.

Figure 5:
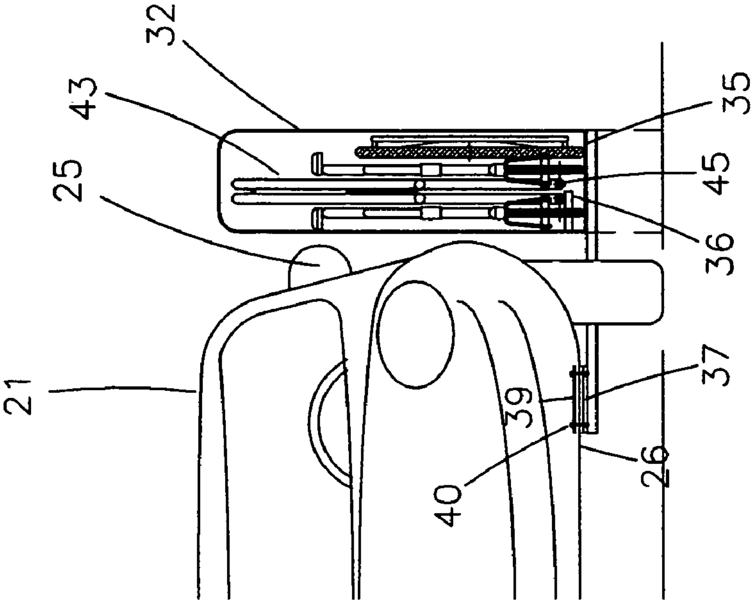
FIG. 5 is a sectional view taken across the wheelchair carrier on line 50-50 of FIG. 2.

Now, FIG. 5 continues with a sectional view showing the folded wheelchair 43 of the preferred embodiment having the right rear wheel 44 removed, said wheelchair resting within carrier 32 where bracket 36 is mounted to support wheelchair frame 45. Mounting the carrier 32, upper inside plate 39 is through bolted with bolts and nuts 40 to sandwich the body bottom 26 with bottom plate 37 having cantilever beams 31 and 38.

Figure 6:
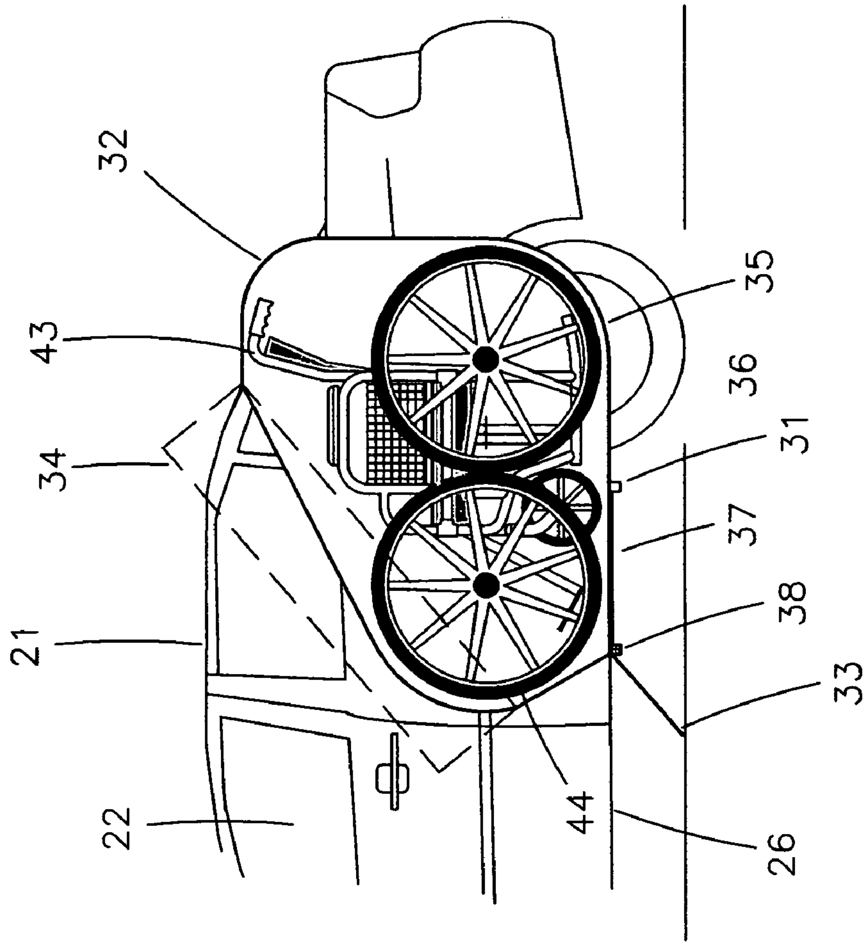
FIG. 6 is a longitudinal sectional view taken on line 60-60 of FIG. 2.

As shown in longitudinal section view FIG. 6, said folded wheelchair 43 rests on carrier bottom 35 and support bracket 36, in wheelchair carrier 32. Top cover/door 34 is open and also the bottom door 33 is open serving as a ramp. The removed right rear wheel 44 is stored in the carrier 32. Bottom plate 37 attaches rear cantilever beam 31 and forward pivoting cantilever beam 38.

Figure 7:
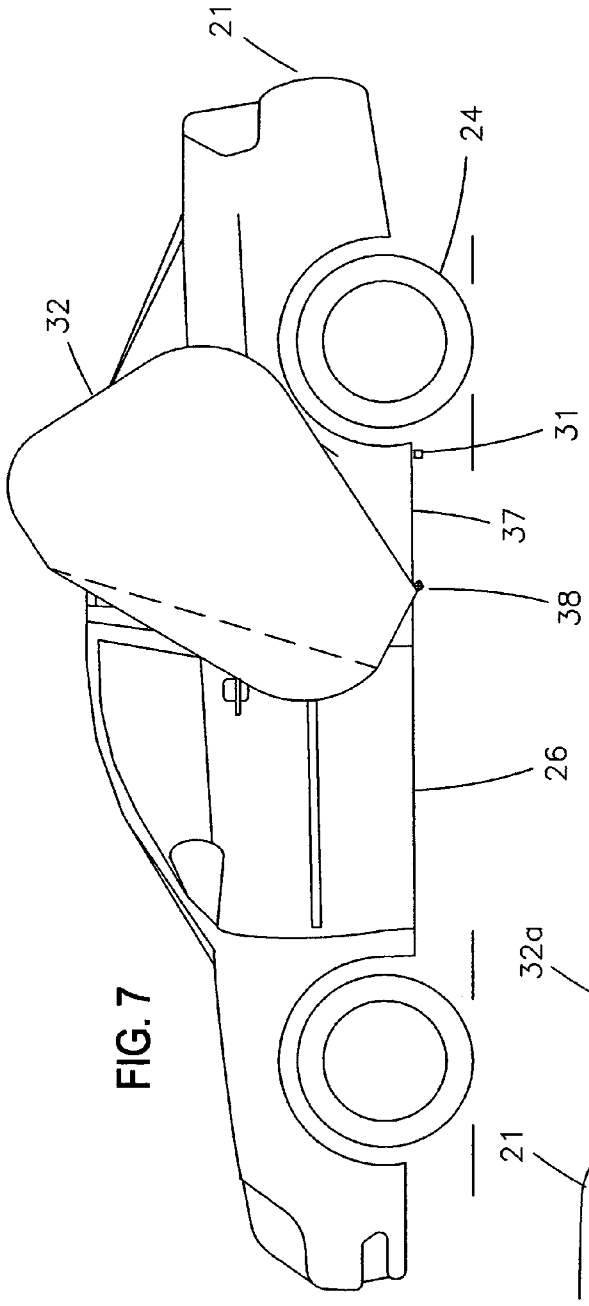
FIG. 7 is a side view of a driver accessible wheelchair carrier rotated to clear the rear tire for service.

Yet another novel feature of the wheelchair carrier 32 of this application is shown in FIG. 7 in which rear cantilever beam 31 is unbolted from wheelchair carrier 32 allowing said carrier to pivot on forward cantilever beam 38. This affords service of the automobile's left rear wheel and tire 24.

Figure 8:
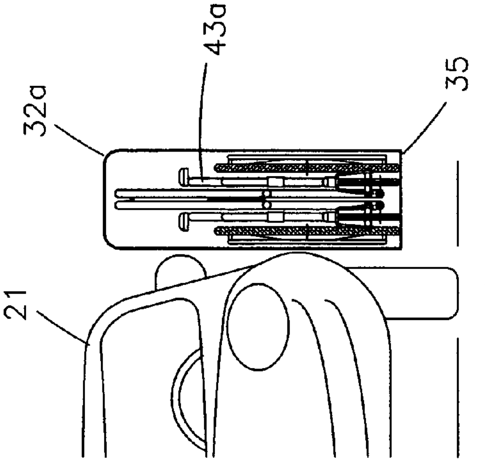
FIG. 8 is an end sectional view of an alternate driver accessible wheelchair carrier sized for a wheelchair with both rear wheels in place.
Figure 9:
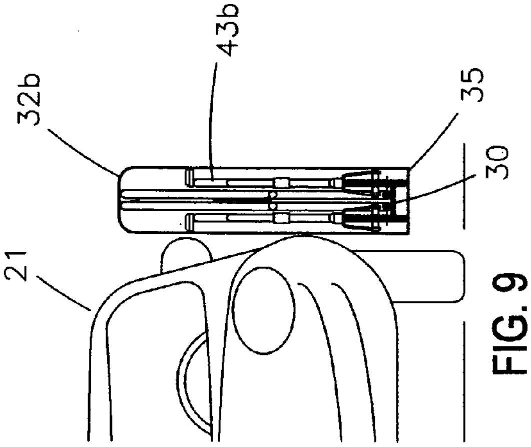
FIG. 9 is an end sectional view of an alternate driver accessible wheelchair carrier sized for a wheelchair with no rear wheels in place.

In an alternate embodiment, FIG. 8 shows a wider wheelchair carrier 32*a* wherein a wheelchair 43*a* is carried without removing either rear wheel. Further, FIG. 9 shows another alternate embodiment, a narrow wheelchair carrier 32*b* for wheelchair 43*b* with both rear wheels removed. Slide 30 on carrier bottom 35*b* affords loading the wheelchair into said carrier. This version is the lowest in profile height.

Figure 10:
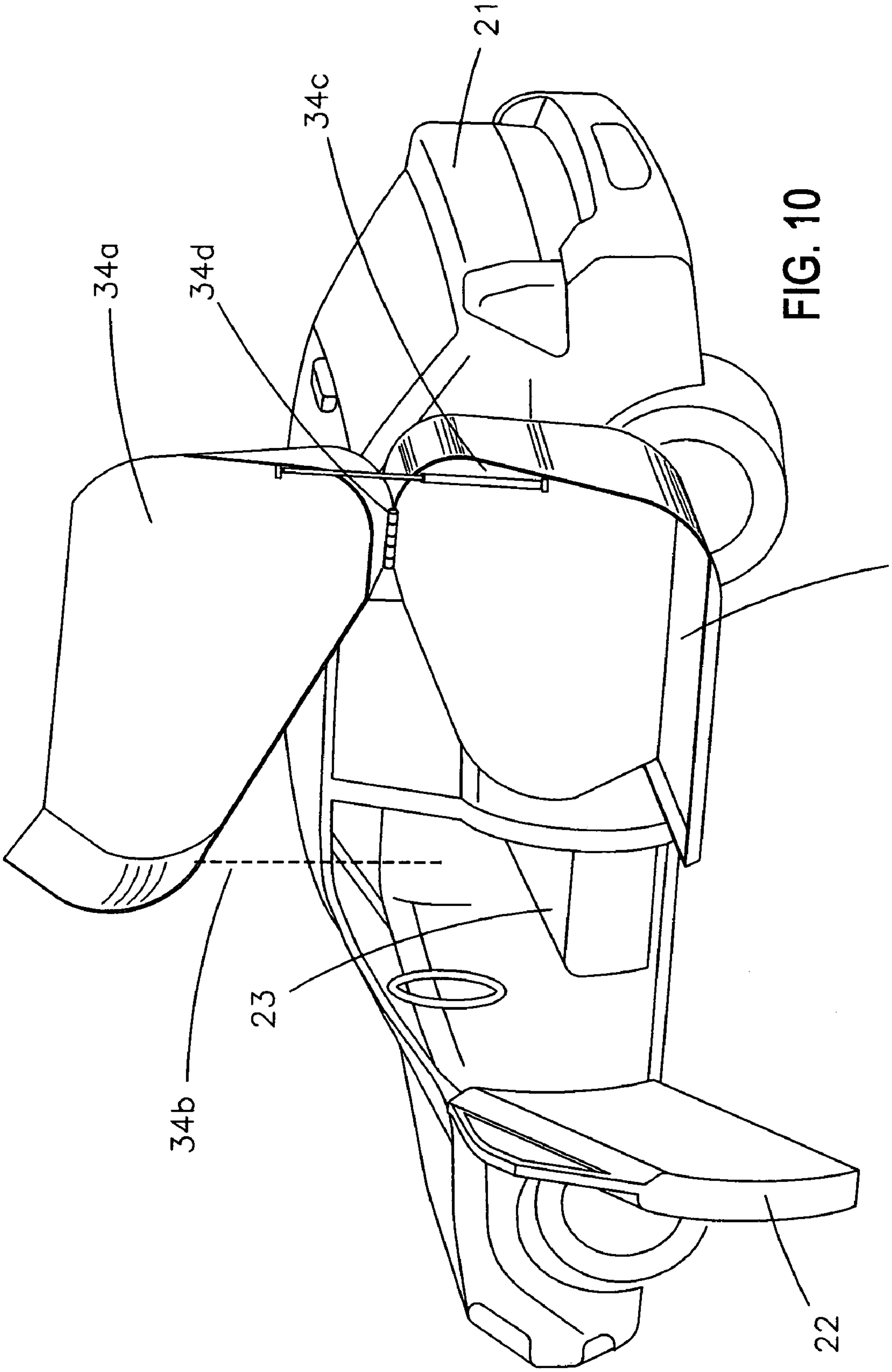
FIG. 10 is a perspective view of an alternate embodiment, having a clam shell top cover for the wheelchair carrier of the present invention.

Now, turning to FIG. 10 in a perspective view, an alternate embodiment uses a clam shell top cover 34*a* over carrier bottom 32*c*. After loading wheelchair 43, gas strut supported cover 34*a* is pulled down with lanyard 34*b*. The clam shell top cover 34*a* affords aerodynamic streamlining of the wheelchair carrier.

Figure 11:
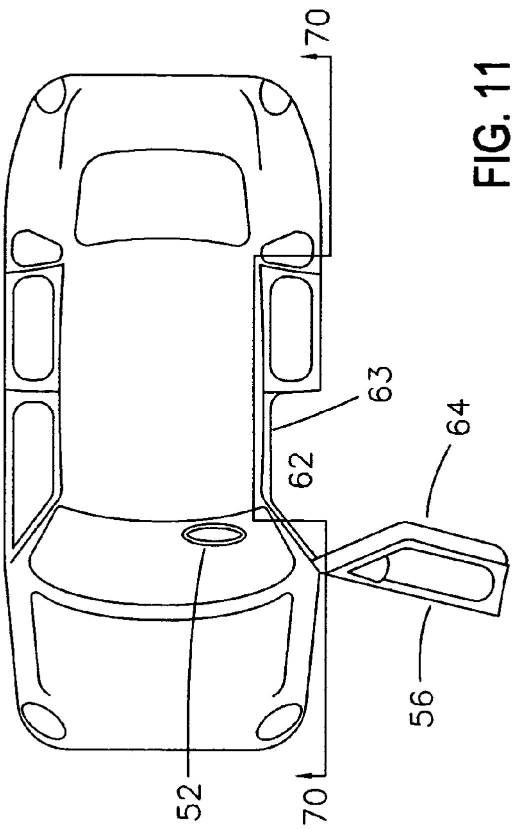
FIG. 11 is a plan view of an alternate embodiment, having a driver accessible wheelchair carrier incorporated within the automobile body, drivers door open.

The plan view FIG. 11 shows an alternate novel feature of an automobile having of an open floor space 62 allowing excess for a wheelchair user, from his wheelchair to the carrier space 59 incorporated within the automobile body 21*a* and to the repositioned driver's seat 53 and steering wheel 52. The driver's door 56 and floor filler piece 64 swing open wide for wheelchair clearance, then fill in completely open space 62 when closed.

Figure 12:
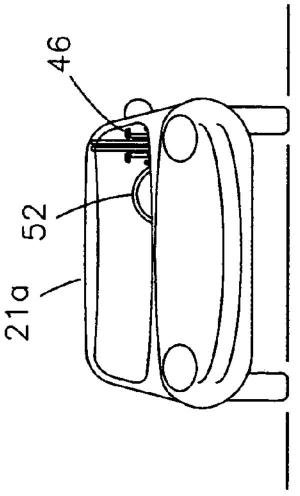
FIG. 12 is an end view of an alternate embodiment, having a driver accessible wheelchair carrier incorporated within the automobile body.

FIG. 12 is an end view of the automobile 21*a* having a driver accessible wheelchair carrier space 59 parallel to the axis of the automobile incorporated within its body and thus preserving the original size and shape of the car.

Figure 13:
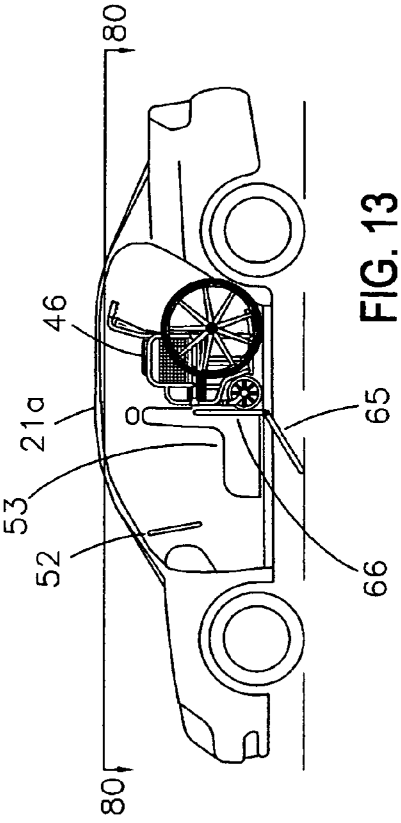
FIG. 13 is a partial sectional side view of the automobile, taken on line 70-70 of FIG. 11.

In more detail, FIG. 13 is a sectional side view of the automobile 21*a*, showing the floor structural reinforcement

63 below the driver's seat 53 with ramp 66 in the up position where it provides a stop for wheelchair 43$a$ while in space 59. The fold down ramp 56 is shown in dashed lines.

Figure 14:
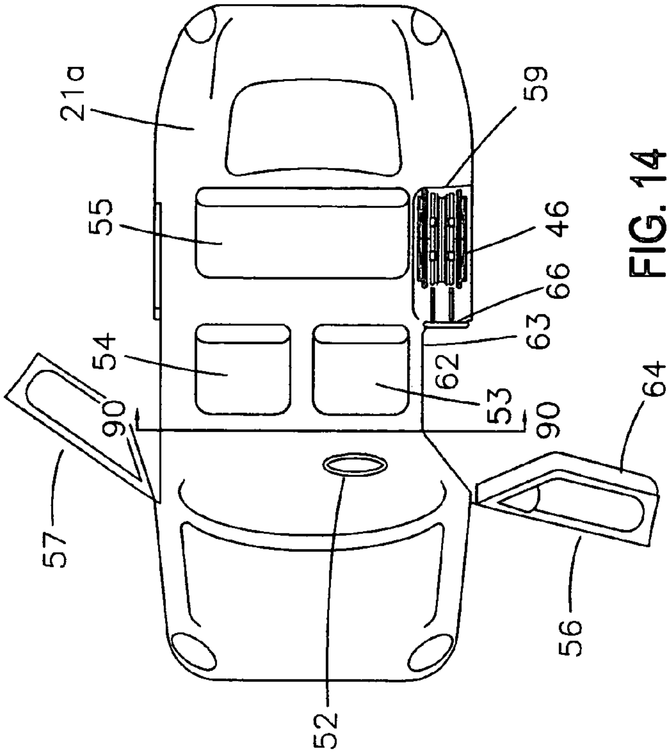
FIG. 14 is a partial sectional plan view of the automobile with the front doors open, taken on line 80-80 of FIG. 13.

Yet, the partial plan section view FIG. 14 shows clearly the open floor space 62 affording easy excess to the wheelchair carrier space 59 for a wheelchair user, from his wheelchair and also to the repositioned driver's seat 53 and steering wheel 52. Modern cars use multiple universal joints in their steering columns, making the new position an easy task using driver hand controls for the accelerator and break. The front passenger seat 54 and door 57 are standard. Rear passenger seat 55 is shortened affording carrier space 59. In the up position ramp 66 provides the stop for wheelchair 43$a$ while in space 59.

Figure 15:
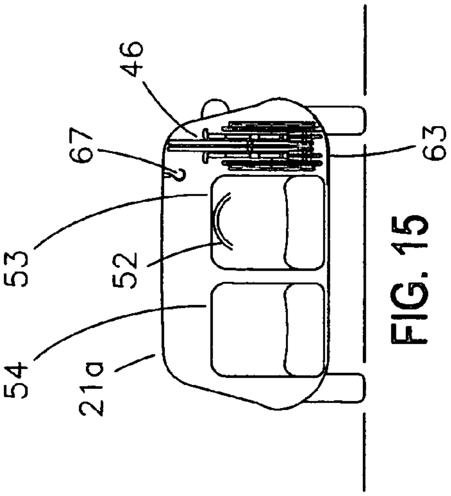
FIG. 15 is a sectional view of the automobile, taken on line 90-90 of FIG. 14.

Sectional end view FIG. 15 of the automobile 21$a$, shows passenger seat 54, driver's seat 53, and carrier space 59 with structural reinforcement 63 around open space 62. The hook from the roof 67 is centered over open space 62.

Figure 16:
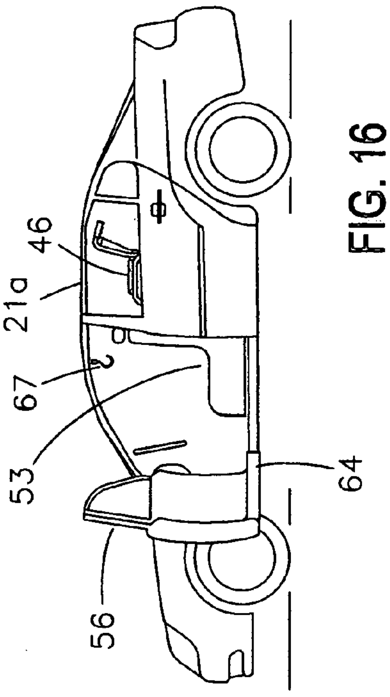
FIG. 16 is a side view of the alternate embodiment automobile with the drivers door open.

FIG. 16 is a side view of the automobile 21$a$, showing the drivers door 56 with floor filler piece 64 open. Structural reinforcement 63 is below the driver's seat 53. The hook from the roof 67 is centered over open space 62.

Although a preferred embodiment has been shown and described, it will be apparent to those skilled in the art that many changes and modifications may be made without departing from the spirit and scope of the present invention.

What is claimed is:

1. A carrier for a folded wheelchair, said carrier attached to a side of an automobile outside of its passenger compartment adjacent to and behind the driver's door, and accessible to an automobile driver from his or her driver's seat, comprising:

a. a multi-sided compartment designed, sized and constructed so as to entirely house at least a conventional wheelchair in a folded position with one rear wheel removed, the two rear chair wheels, when stored in said compartment, residing one in front of the other;

b. said compartment attached to the automobile by means of at a least a pair of cantilevered beam elements, the first said beam element providing a pivoting attachment point and the second said beam element providing a selective attachment point, such that by disengaging said second beam element from said compartment, the compartment can be rotated upwardly and forwardly on said first beam element; and c. said compartment having a door that is selectively openable and closeable through which said wheelchair can be loaded into or unloaded out of said compartment.

2. The invention of claim 1 in which said compartment is closed on all sides, and said door comprises an outwardly folding diagonally hinged upper cover and a lower front door section, said lower front door section being hinged at its bottom to fold downward, wherein said lower front door section, when opened, serves as a ramp for the wheelchair.

3. The invention of claim 2 in which said compartment has an aerodynamic shape such that when attached to the automobile, its upper surface tapers downwardly toward the front the automobile.

4. The invention of claim 1 in which said compartment has a clam shell construction comprising a first piece that is attached to the automobile by said beam elements, and a second piece that substantially comprises the front and outerside of the compartment and which is hinged to said first piece substantially at the upper edge of said first piece.

* * * * *